US008580151B2

(12) United States Patent
Troxclair, III

(10) Patent No.: US 8,580,151 B2
(45) Date of Patent: Nov. 12, 2013

(54) FLUX ADDITION AS A FILTER CONDITIONER

(75) Inventor: Emile J. Troxclair, III, Houston, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 613 days.

(21) Appl. No.: 12/698,660

(22) Filed: Feb. 2, 2010

(65) Prior Publication Data

US 2011/0147666 A1 Jun. 23, 2011

Related U.S. Application Data

(60) Provisional application No. 61/287,812, filed on Dec. 18, 2009.

(51) Int. Cl.
*C01B 3/02* (2006.01)
*C01B 3/32* (2006.01)
*C01B 3/34* (2006.01)
*C01B 3/36* (2006.01)
*B01J 7/00* (2006.01)

(52) U.S. Cl.
USPC .............................. 252/373; 48/61; 48/197 R

(58) Field of Classification Search
USPC ......................... 252/373; 48/61–118.5, 197 R
See application file for complete search history.

(56) References Cited

U.S. PATENT DOCUMENTS

| 3,746,522 | A | * | 7/1973 | Donath ............................ 48/202 |
| 3,976,443 | A | * | 8/1976 | Paull et al. .................. 48/197 R |
| 4,613,344 | A | * | 9/1986 | Henrich et al. .................... 48/77 |
| 4,776,285 | A | * | 10/1988 | Wallner et al. ................. 110/229 |
| 5,243,922 | A | * | 9/1993 | Rehmat et al. ................. 110/233 |
| 5,601,784 | A | * | 2/1997 | Glover et al. .................... 422/70 |
| 6,863,878 | B2 | * | 3/2005 | Klepper ......................... 423/650 |
| 7,387,662 | B2 | * | 6/2008 | Ahman et al. ................... 95/108 |
| 7,402,188 | B2 | * | 7/2008 | Sprouse ............................ 48/77 |
| 7,951,350 | B1 | * | 5/2011 | Taylor ......................... 423/418.2 |
| 8,007,688 | B2 | * | 8/2011 | Dahlin et al. .................. 252/373 |
| 8,238,889 | B1 | * | 8/2012 | Vu .............................. 455/414.3 |
| 2003/0089038 | A1 | * | 5/2003 | Weaver ........................... 48/210 |
| 2003/0182861 | A1 | * | 10/2003 | Weimer et al. .............. 48/197 R |

(Continued)

FOREIGN PATENT DOCUMENTS

| DE | 3700553 C2 | 1/1989 |
| EP | 1217059 A1 | 6/2002 |
| WO | WO2007035169 | 3/2007 |

OTHER PUBLICATIONS

PCT/US10/53398 International Search Report (Form PCT/ISA/220) dated Dec. 28, 2010.

*Primary Examiner* — Wayne Langel
(74) *Attorney, Agent, or Firm* — Osha • Liang LLP

(57) ABSTRACT

Improvements in a gasification system and process for gasifying carbonaceous feedstock with improved energy efficiency. Improved methods and systems for more efficient removal of particulates from a raw synthesis gas while simultaneously providing a novel mechanism for fluxing agent addition to the gasification reactor. A conditioning agent, in the form of coarse fluxing agent particles, is added to the raw synthesis gas upstream from the particle filtration unit. The conditioning agent allows more rapid turnaround of the filtration unit following filter element replacement, extend filter life, facilitates the removal of filter cake from the particle filters, and combines with removed filter cake for recycling to the gasifier. Addition of fluxing agent via this route eliminates the need to premix fluxing agent with the carbonaceous feedstock, thereby maximizing the rate of feedstock addition to the gasification reactor.

10 Claims, 1 Drawing Sheet

(56) References Cited

U.S. PATENT DOCUMENTS

| | | |
|---|---|---|
| 2008/0147241 A1 | 6/2008 | Tsangaris et al. |
| 2008/0190024 A1* | 8/2008 | Hobbs ............................. 48/76 |
| 2008/0250714 A1* | 10/2008 | Palonen et al. .......... 48/197 FM |
| 2009/0019767 A1* | 1/2009 | Abughazaleh et al. ........... 48/61 |
| 2009/0038222 A1* | 2/2009 | Douglas et al. ................... 48/73 |
| 2009/0094893 A1* | 4/2009 | Neumann .................... 48/62 R |
| 2009/0101598 A1* | 4/2009 | Kain et al. .................... 210/771 |
| 2009/0183430 A1* | 7/2009 | Schubert et al. ................. 48/85 |
| 2010/0132257 A1* | 6/2010 | Agrawal et al. .................. 48/85 |
| 2012/0101323 A1* | 4/2012 | Ariyapadi et al. ........... 585/700 |
| 2012/0256133 A1* | 10/2012 | Apanel et al. ................ 252/373 |

* cited by examiner

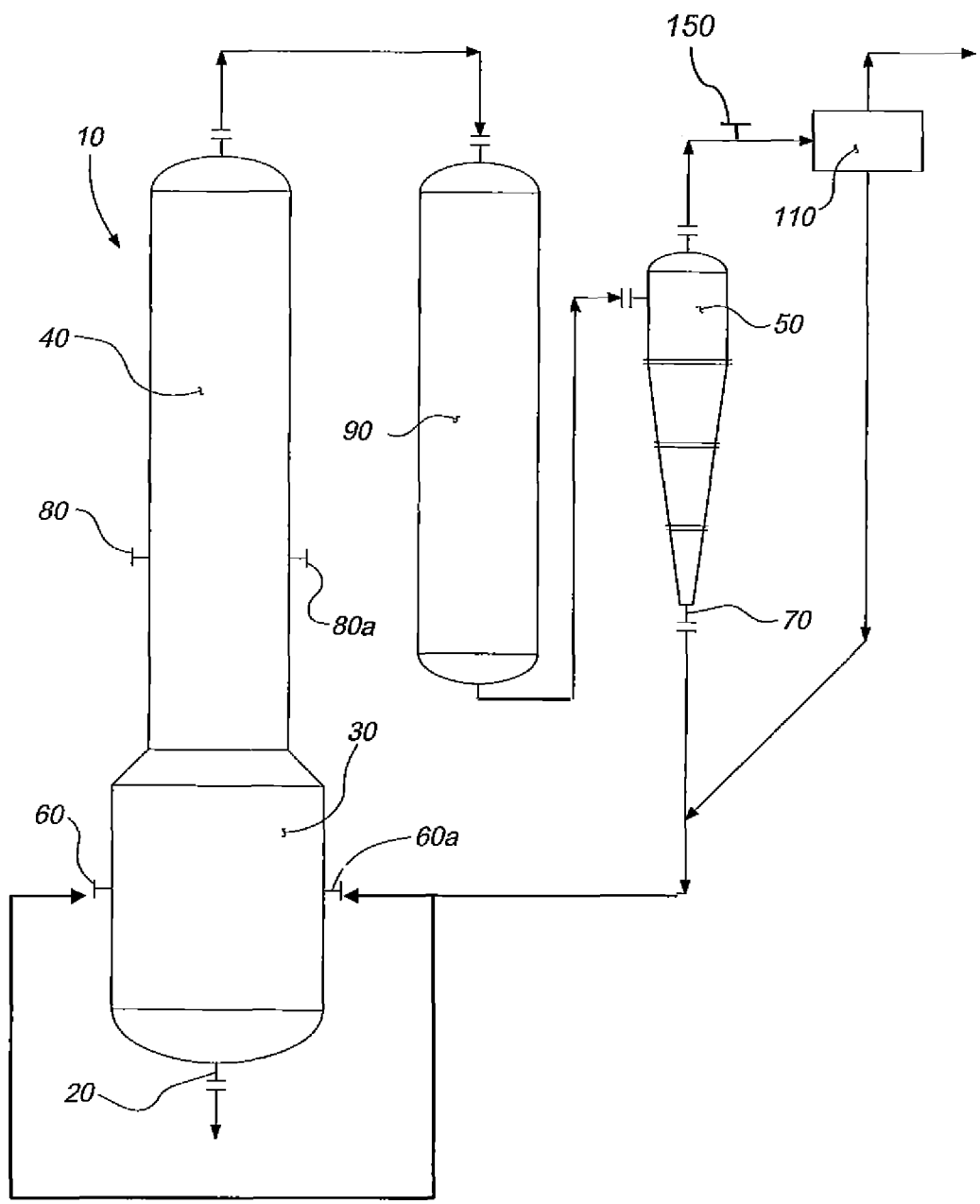

FLUX ADDITION AS A FILTER CONDITIONER

FIELD OF THE DISCLOSURE

The present invention relates generally to an improvements in the conversion of solid or liquid carbonaceous feedstock into desirable gaseous products such as synthesis gas. More specifically, the present invention relates to improvements in the removal of entrained particulate matter from raw synthesis gas, as well as improvements in the addition of fluxing agent to a gasification reactor.

BACKGROUND OF THE DISCLOSURE

Synthesis gas is a fuel for power generation as well as an important intermediate feedstock for producing chemicals such as hydrogen, methanol, ammonia, substitute natural gas or synthetic transportation oil. Three basic types of systems and processes have been developed for the production of synthesis gas through the gasification of carbonaceous materials. They are: (1) fixed-bed gasification, (2) fluidized-bed gasification, and (3) suspension or entrainment gasification.

The hot raw synthesis gas exiting the gasifier contains entrained particulate matter comprising char, ash, and unconverted carbonaceous feedstock. This entrained particulate matter must be removed prior to further treatment of the synthesis gas, and is separated from the raw synthesis gas by a particulate removal system. The recovered particulate matter is then often recycled back to the first stage of the gasification reactor to increase overall carbon conversion efficiency.

A particulate removal system commonly comprises an initial separating device (typically a cyclone) and a downstream particulate filtration device. A cyclone creates a vortex of gas that facilitates the removal of a large percentage of the entrained particulate matter. Any remaining entrained particulates are removed from the gas stream by the downstream particulate filtration device containing numerous filter elements. These elements retain residual fine particulate matter from the gas stream while allowing passage of synthesis gas, thereby producing a particulate-free gas stream.

However, the functional efficiency of this system can be hampered by the accumulation of fine particles of char within the pores of the filter elements. These fine particles often become lodged deeply within filter element pores, which restricts the permeability of the elements to the passage of synthesis gas. Accumulation of fine particles on the elements over time leads to the formation of a "filter cake" that further decreases the permeability of the elements to gas. To remedy this condition, established practice typically involves directing a periodic pulse of high-pressure gas backwards through the filter elements (known as "back-pulsing") in order to dislodge at least a portion of the accumulated filter cake. However, small particles that are trapped within the filter element pores are often not effectively dislodged by back-pulsing. Infiltration of these particles decreases the lifespan of the filter elements, and hampers routine operation of the particulate filtration device. Thus, there is a need to develop technology that can prevent infiltration of char particles too deeply into the pores of filter elements, thereby 1) reducing the back-pulse gas pressure needed to effectively dislodge filter cake from the filter elements, 2) slowing the rate of increase in differential pressure across the filter elements (thereby extending filter element lifespan), and 4) improving the overall operational efficiency of the particle filtration system.

Filter elements must be periodically replaced, and due to the relatively large pore size of the filter elements, new filters typically have an increased permeability to char particles. Consequently, common practice immediately following filter element replacement is to reduce the flow of raw syngas entering the filtration device until a conditioning of the filters occurs. This conditioning process typically involves the deposition of a thin layer of char particles onto, and within, the pores of the new filter elements. This layer of char particles effectively decreases the permeability of the filter elements to subsequent char particles, while maintaining permeability to gas. Current conditioning protocols require a decrease in the input rate of raw synthesis gas to the filtration unit until this initial thin layer of filter cake accumulates, and this results in decreased operating availability of the particle filtration unit. Thus, there is need to develop technology that decreases the amount of time required to achieve proper conditioning of newly-installed filter elements.

Addition of mineral fluxing agents is common in entrained flow gasification, as the addition of certain minerals to the gasification reactor reduces the fusion temperature of the ash generated by the gasification of carbonaceous material. A reduction in the ash fusion temperature decreases the viscosity of the mineral slag formed during gasification, thereby preventing plugging of the taphole that allows removal of the molten slag from the gasifier. Common practice is to mix fluxing agent with the carbonaceous feedstock prior to adding the feedstock to the gasifier. However, this reduces the overall efficiency of the gasification process both by requiring a mixing step, and also by reducing the maximum rate at which carbonaceous feedstock can be added to the gasifier. Thus, a need exists for improved methods of introducing fluxing agent into the gasification system that does not require premixing of fluxing agent with the carbonaceous feedstock prior to adding feedstock to the gasification reactor.

SUMMARY OF THE PREFERRED EMBODIMENTS

The present invention relates to improvements that increase the efficiency of gasification processes and systems. More specifically, certain embodiments increase the operational efficiency of the particle filtration system by preventing infiltration of char particles too deeply into the pores of filter elements. This, in turn, slows the rate of increase in differential pressure across the filter elements, thereby extending filter element lifespan. Certain embodiments additionally improve the efficiency of feedstock addition to the gasification reactor by eliminating the need to premix fluxing agent with the carbonaceous feedstock.

These improvements are achieved through the addition of a selectively-sized, coarse fluxing agent into the raw synthesis gas stream immediately upstream from the particle filtering device. The material composition and size range of the added fluxing agent particles is adjusted to properly condition the filter elements, wherein conditioning involves the deposition of a thin layer of fluxing agent particles onto the filter that maintains the permeability of the filter to synthesis gas. Relatively coarse flux particles are used for filter conditioning because these particles predominantly accumulate at, or near the surface of, the filter matrix during conditioning of the filter element, thereby inhibiting subsequent deep penetration of the filter matrix by smaller particles of char. The char particles instead accumulate predominantly outside of the filter elements as filter cake, thereby being more easily dislodged by periodic back-pulsing events. The overall benefit of using this strategy to condition the filter elements is that it slows the rate of increase in differential pressure across the filter elements, thereby extending filter element lifespan.

Following its function in conditioning the filter elements of the particle filtration unit, at least a portion of the fluxing agent is dislodged from the filter elements with each back-pulsing event along with at least a portion of the accumulated filter cake. The fluxing agent and removed filter cake then fall by force of gravity to a bin located at the bottom of the particle filtration unit, and this mixture is then recycled to the first stage of the gasifier. The recycling step increases the overall conversion efficiency of the carbonaceous feedstock, while simultaneously providing a novel mechanism for introducing fluxing agent into the gasification reactor.

A common practice is to mix fluxing agent with carbonaceous feedstock prior to adding the resulting mixture to the gasifier. However, this dilutes the feedstock, thereby reducing the maximum rate at which carbonaceous feedstock can be fed to the gasification reactor. In the current disclosure, the fluxing agent instead enters the gasification reactor along with the recycled char and ash collected by the particulate removal system. Thus, the carbonaceous feedstock added to the first stage of the reactor is not diluted by fluxing agent, which increases the efficiency of the overall gasification process. The material composition of the fluxing agent to be added can be adjusted as needed to adjust the melting point and viscosity of the molten slag at the bottom of the first stage of the gasifier, thereby assisting in the proper drainage of molten slag from the gasifier.

Certain embodiments of the present invention comprise an improved process for gasification of a carbonaceous material, comprising: a) providing a gasification reactor, wherein said reactor converts carbonaceous feedstock to produce a mixture product comprising a first gaseous product stream and char, wherein said gaseous product stream comprises $H_2$, and CO, b) passing said mixture product through an initial separating device, whereby a majority of said char is removed from said gaseous product stream, c) introducing a coarse particulate fluxing agent into the gaseous product stream downstream from said initial separating device, d) providing a particle filtration unit comprising a plurality of filter elements downstream from the point of introduction of said coarse particulate fluxing agent, d) depositing a thin layer of the fluxing agent onto and within the pores the filter elements, thereby conditioning the filter elements and decreasing the subsequent permeability of the filter elements to entrained char particles, while maximizing permeability of the filter elements to synthesis gas, e) periodically removing a mixture comprising filter-cake from the filter elements by back-pulsing, wherein said filter-cake comprises coarse particulate fluxing agent and char. f) forming a mixture comprising the removed char of step b) and the removed filter-cake of step f), then routing this mixture to the gasification reactor of step a). In certain embodiments, the gasification reactor of step (a) comprises a first and second stage. In certain embodiments, said coarse particulate fluxing agent decreases the melting point and viscosity of molten slag in the gasification reactor, thereby assisting in the removal of the molten slag from the reactor. In certain embodiments, the average size of said coarse particulate fluxing agent is from about 5 to 35 microns. In certain embodiments, said coarse particulate fluxing agent may comprise limestone, magnesium oxide, clay, silicates, borates, flyash, slag, and mixtures thereof. In certain embodiments, this process may further comprise a step of passing said mixture product of step (a) into a heat recovery zone prior to step (b), wherein said heat recovery zone comprises a heat recovery device selected from a group consisting of radiant heat type boiler, water tube boiler, fire tube boiler and combinations thereof.

Certain additional embodiments of the invention comprise an improved process for gasification of a carbonaceous material, comprising the following steps: a) providing a gasification reactor comprising a first and second stage, wherein said reactor converts carbonaceous feedstock to produce a mixture product comprising a first gaseous product stream and a solid particulate stream, wherein said first gaseous product stream comprises $H_2$ and CO, and wherein said solid particulate stream comprises char, b) passing said mixture product through an initial separating device, whereby a majority of said char is removed from said gaseous product stream, c) introducing a coarse particulate fluxing agent into the gaseous product stream downstream from said initial separating device, d) providing a particle filtration unit comprising a plurality of filter elements downstream from the point of introduction of said coarse particulate fluxing agent, e) depositing a thin layer of the fluxing agent onto and within the pores the filter elements, thereby conditioning the filter elements and decreasing the subsequent permeability of the filter elements to entrained char particles, while maximizing permeability to synthesis gas, f) periodically removing a mixture comprising filter-cake from the filter elements by back-pulsing, wherein said filter-cake comprises coarse particulate fluxing agent and char, and g) forming a mixture comprising the removed char of step b) and the removed filter-cake of step f), then routing this mixture to the gasification reactor of step a). In certain embodiments, the process may further comprise a step of passing said mixture product of step a) into a heat recovery zone prior to step b), wherein said heat recovery zone comprises a heat recovery device selected from a group consisting of radiant heat type boiler, water tube boiler, fire tube boiler and combinations thereof. In certain embodiments, said coarse particulate fluxing agent decreases the melting point and viscosity of molten slag in the gasification reactor, thereby assisting in the removal of the molten slag from the reactor. In certain embodiments, said coarse particulate fluxing agent may comprise limestone, magnesium oxide, clay, silicates, borates, flyash, slag, and mixtures thereof.

Certain embodiments of the invention comprise a system for the gasification of a carbonaceous material, comprising: a) a reactor for the gasification of a solid stream comprising particulate carbonaceous feedstock to produce heat and a mixture product comprising synthesis gas and char; b) an initial separating device for separating said mixture product of part a) to create a gaseous product stream and a first solid product stream comprising char; c) a coarse particulate fluxing agent, d) an entry point for the addition of a coarse particulate fluxing agent downstream from the initial separating device of part b); e) a particle filtration unit for filtering the gaseous product stream of part b) and the coarse particulate fluxing agent of part c) to retain residual particles of char, thereby creating a second solid product stream while allowing passage of said gaseous product stream of part b); f) piping for conducting the first and second solid streams, having a first terminus at the initial separating device of part b) for conducting the first solid product stream of part b), a second terminus at the particle filtration unit of part c) for conducting the second solid product stream, a connector for combining the first and second solid products streams, and a third terminus at the gasification reactor for allowing entry into the reactor of a mixture product comprising the first and second solid product streams and the coarse particulate conditioning agent of part c). In certain embodiments, this system may further comprising a heat recovery device placed upstream from the initial separating device of part (c), wherein said heat recovery device is selected from the group consisting of radiant heat type boiler, water tube boiler, fire tube boiler and combinations thereof.

Certain embodiments of the invention comprise a system for the gasification of a carbonaceous material, comprising: a) a reactor lower section for partially combusting a solid stream comprising particulate carbonaceous feedstock with a gas stream comprising an oxygen-containing gas to produce heat and a first mixture product comprising synthesis gas, char, and molten slag; b) a reactor upper section for pyrolyzing said mixture product of part a) with a first slurry stream comprising particulate carbonaceous material in a liquid carrier to produce a second mixture product comprising synthesis gas and char; c) an initial separating device for separating said second mixture product of part b) to create a gaseous product stream and a first solid product stream comprising char; d) a coarse particulate fluxing agent; e) an entry point for the addition of the coarse particulate fluxing agent of part d) downstream from the initial separating device of part c); f) a particle filtration unit for filtering the gaseous product stream of part c) and the coarse particulate fluxing agent of part d) to retain residual particles of char, thereby creating a second solid product stream while allowing passage of said gaseous product stream; g) piping for conducting the first and second solid streams, having: a first terminus at the initial separating device of part c) for conducting the first solid product stream of part b), a second terminus at the particle filtration unit of part f) for conducting the second solid product stream, a connector for combining the first and second solid products streams, a third terminus at the reactor lower section of part a) for allowing entry into the reactor of a mixture product comprising the first and second solid product streams and the coarse particulate conditioning agent of part d). In certain embodiments, the system may additionally comprise a heat recovery device placed upstream from the initial separating device of part c), wherein the heat recovery device is selected from a group consisting of radiant heat type boiler, water tube boiler, fire tube boiler and combinations thereof. In certain embodiments, the initial separating device of the system may comprises a cyclone, and the particle filtration unit may comprise a candle filter.

BRIEF DESCRIPTION OF THE DRAWINGS

For a more detailed description of the embodiments of the present invention, reference will now be made to the accompanying drawings:

The FIGURE is a schematic representation of one embodiment of the present invention. A gasification system is depicted that incorporates the improvements of the present invention.

DETAILED DESCRIPTION OF THE PREFERRED EMBODIMENTS

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Certain embodiments may comprise a slurry-fed gasification system, many of the details of which are beyond the scope of this document. Other embodiments may comprise a two-stage gasification process, many of the details of which are also beyond the scope of this document, and have been previously described in detail in U.S. Provisional Patent Applications 61/165,784, 61/138,312, 61/165,784, and 61/146,189, as well as U.S. patent application Ser. Nos. 12/192,471 and 11/834,751, which are all hereby incorporated by reference in their entirety. Thus, details of the gasification process will be described herein only in the detail required to fully disclose the current improvement to the gasification process and system. The current invention may be adapted for use with any type of gasification system currently known in the art (e.g., single-stage or dual-stage; slurry-feed or dry-feed). Thus, the specific embodiments of the invention described here are not intended to limit the scope of the invention to a two-stage slurry-feed gasification process or system.

In certain embodiments, gasification is accomplished by partial combustion of the carbonaceous material with air or high purity oxygen in a first stage, creating hot synthetic gas. The residual mineral content forms a molten slag that is continuously removed from the gasifier. In certain embodiments, the hot synthesis gas created in the first stage vaporizes and gasifies additional coal slurry introduced in the second stage. The synthesis gas exiting the gasifier is cooled and cleaned, and is then moisturized prior to use in an advanced gas turbine for the generation of power (or conditioned further for the production of chemicals such as hydrogen, methanol, urea, Fischer-Tropsch products, etc.).

Referring to the FIGURE, certain embodiments of the present invention provide a two-stage gasification reactor 10, that comprises a reactor lower section 30 and a reactor upper section 40. The reactor lower section 30 defines the first stage reaction zone, and will also be referred to as the first stage reaction zone. The reactor upper section 40 defines the second stage reaction zone, and will also be referred to as the second stage reaction zone. In the embodiment depicted in the FIGURE, the unfired reactor upper section 40 of the reactor 10 is connected directly to the top of the fired reactor lower section 30 of the reactor 10 so that the hot reaction products are conveyed directly from the reactor lower section 30 to the reactor upper section 40, thereby minimizing heat losses in the gaseous reaction products and entrained solids.

Within the reactor lower section 30, also the first stage reaction zone of the gasification reactor 10, a carbonaceous feedstock mixes with a gas stream comprising an oxygen-containing gas and/or steam and a rapid exothermic reaction takes place in which the carbonaceous feedstock is converted into a first mixture product comprising steam, synthesis gas, intermediate gases, and entrained by-products such as ash. Ash is comprised of the non-combustible mineral content of the carbonaceous feedstock. The temperature of the first stage is maintained higher than the ash melting point. Thus, the ash that is formed melts and agglomerates to form a viscous liquid known as slag. The slag falls to the bottom of the first stage 30, flows through a taphole 20, whereupon it is water-quenched and directed to a slag processing system (not shown) for final disposal.

The primary combustion reaction in the first stage is

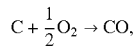

which is highly exothermic. It raises the temperature of the syngas in the first stage between 2000 and 3500° F. The heat produced in the reactor lower section 30 and carried upward with the gas stream is used for the pyrolysis process which takes place in the unfired reactor upper section 40, including vaporization of the feed water, the carbon-steam reaction and the water-gas reaction between CO and $H_2O$. The carbon-steam reaction forms CO and $H_2$, thus, increasing the yield of these usable gases. The steam utilized during the gasification process may be generated from the heat recovery unit 180, which in turn derives its heat from the hot syngas exiting from the second stage 40 of the gasifier 10.

In the embodiment shown in the FIGURE, solid feedstock is pulverized before entering a feeding system such as, but not limited, to a lock-hopper system. The pulverized solid stream comprising particulate carbonaceous material from the feeding system is injected into the gasification reactor 10 upper section 40 through feeding device 80 and/or 80a. In certain alternative embodiments (not depicted) alternative feeding devices, such as, but not limited to, slurry feeding systems, can be utilized to add feedstock to the gasification reactor.

The physical conditions of the reaction in the second stage of the gasification process in the reactor upper section 40 are controlled to assure rapid gasification and heating of the feedstock above its range of plasticity. Once dispersed into the upper section, the feedstock comes into contact with the hot syngas rising from the gasification reactor lower section 30. The carbonaceous material is dried and a portion of it is gasified via pyrolysis reactions such as the carbon steam reaction ($C+H_2O \rightarrow CO+H_2$), whereby $H_2$ and CO are produced. As pyrolysis reactions are endothermic, the temperature for the mixture of the carbonaceous material and the syngas decreases as the mixture travels upwards through the upper section 40 of the reactor. By the time the raw synthesis gas mixture product exits the top of the upper section 40 of the gasifier 10, the raw synthesis gas mixture temperature decreases to between 500° F. and 2500° F., but more preferably between 700° F. and 2000° F.

According to an embodiment shown in the FIGURE, the raw synthesis gas mixture comprising solid particles and a gaseous product stream exits the reactor upper section 40 and is optionally sent to a heat recovery device 90 to reduce the temperature of the raw synthesis gas mixture prior to cleanup. The operating temperature of the heat recovery zone is adjusted and controlled to allow the final temperature of the combined stream of second stage mixture products and the solid stream comprising particulate carbonaceous material, both exiting from drying unit 120 to be between 300 and 1200° F., preferably between 400 and 1000° F., and most preferably to be between 500-600° F.

Heat recovery devices that are useful for the present invention are known in the art, and may be, but are not limited to, a radiant heat-type boiler, water tube boiler, or fire tube boiler. In other embodiments, the heat recovery zone 90 may comprise a cold recycled syngas as quenching gas. Upon exiting the heat recovery device, the temperature of the second mixture product is between 500 and 2500°.

The cooled raw synthesis gas mixture is then directed to an initial separating device 50 that splits the mixture into a solid product stream and second gaseous product stream. This initial separating device 50 may comprise a particle removal cyclone, the design and usage of which is commonly known in the art. The second gaseous product stream contains a reduced amount of the solid particles originally present in the raw synthesis gas mixture. The solid product stream, comprising char, exits separating device 50 and is recycled back to the reactor lower section 30 of the gasifier 10 through dispersion devices 60 and/or 60a, wherein the solid product stream mixes with gaseous oxidant (and/or steam at high pressure) in the first stage 30 of the reactor 10.

Further referring to the FIGURE the second gaseous product stream exiting from separating device 50 comprises hydrogen, carbon monoxide, a small amount of methane, hydrogen sulfide, ammonia, nitrogen, carbon dioxide and a residual solids stream comprising smaller solid particles of char. These smaller solid particles are commonly removed downstream from the initial separating device 50 by a particle filtration unit 110. The particle filtration unit may comprise a bag filter or a candle filter, and the use of these filters is commonly known in the art. Preferably, the filtration unit comprises a candle filter, which contains a series of filter units that are commonly in the shape of a series of elongated tubes. The filtration media of the filter units utilized may comprise a variety of chemical compositions, such as, but not limited to, silicon carbide, clay-bonded silicon carbide, mullite/alumina, cordierite, alumino-silicates, silicon nitrides, calcium silicates, or alloys such as iron aluminides, hastalloy, incoloy or stainless steel.

After a period of time, smaller solid particles of char accumulate on the filter elements of the filtering device, thereby forming a "filter cake" that increases resistance to the passage of gas through the filters. To maintain gas flow, a common practice is to introduce a high-pressure pulse of gas backwards through the filters (known as "back-pulsing"), thereby dislodging at least a portion of the filter cake, but preferably a majority of the filter cake. The back-pulsing event may also dislodge a portion, but preferably most of, the fluxing agent. The dislodged filter cake and fluxing agent fall by gravitational force to a holding bin at the bottom of the particle filtration unit 110, and form a mixture that is then removed by any of several mechanisms commonly known in the art, such as, for example, a rotating airlock. The mixture is then combined with the solid particulate stream removed by initial separating device 50, and pneumatically transported through piping back to the first stage 30 of the gasifier 10. The gas utilized to pneumatically transport said mixture may be a cooled raw synthesis gas under high pressure.

As mentioned, periodic back-pulsing dislodges, or removes, at least a portion of the fluxing agent from the filter elements. The removed fluxing agent is replenished by addition of new fluxing agent immediately upstream from the particle filtration unit 110. This addition may be either continuous, or periodic. In certain embodiments, the periodic addition of fluxing agent may first occur during a conditioning period immediately following the replacement of filter elements in the particle filtration unit 110. Subsequent periodic additions of fluxing agent may be synchronized to immediately follow a back-pulsing event so as to assist in rapidly re-conditioning the filter elements by replacing the fluxing agent dislodged from the filter elements by the back-pulse.

Periodically, the filter elements of the particle filtration unit 110 must be replaced. The filtration media of the new replacement filter elements has a pore size that allows the passage of some smaller particles of char. Thus, newly-installed filter elements are often subjected to a "conditioning" period wherein gas flow through the particulate filtration device is reduced, and a thin layer of filter cake is allowed to accumulate on the elements. The objective of this conditioning period is to decrease the subsequent permeability of the filters to entrained char particles, while maintaining permeability to synthesis gas. Once conditioning of the filter elements is complete, the gas flow rate of the particulate removal device is increased to normal flow. However, this process often takes an inordinate length of time, and the smaller particles of char often infiltrate deeply into the pores of the filtration media such that they overly restrict the permeability of the filters to gas. In addition, these deeply-infiltrated particles of char often cannot be removed by back-pulsing the filter.

In certain embodiments, the conditioning of newly-installed filter elements is more rapidly accomplished by first adding a selectively-sized, coarse fluxing agent into the raw synthesis gas stream immediately upstream 150 from the particle filtration unit 110, and downstream from the separating device 50. The material composition and size of the fluxing agent particles is adjusted relative to the pore size of the filtration media such that the particles predominantly accumulate at, or near the surface of, the filtration media pores, thereby inhibiting subsequent deep penetration of the filtration media pores by smaller particles of char. Preferably, the particle size of the filter aid or filter conditioner is larger than the pore opening of the filter, yet small enough that it can be easily entrained in the gas stream. The particle size should also be such that the pore opening of the resulting filter cake is smaller than the average size of the particles to be filtered. Generally, sub-micron sizes are avoided, and an approximate size range of 5-30 microns is preferred. Once conditioning of the filer elements is complete, subsequent accumulation of filter cake occurs predominantly on top of the first layer of filter cake formed by deposited fluxing agent, thereby being more easily dislodged by periodic back-pulsing events.

The addition of coarse fluxing agent may also serve to capture and scavenge certain trace contaminants or volatile metals, such as, but not limited to, arsenic and germanium. However, the relatively coarse particle size range of the fluxing agent that is added (preferably 5-35 microns in diameter) is primarily designed to function as a conditioning agent for the filter elements of the particle filtration unit 110.

The synthesis gas exiting the particle filtration unit 110 will be essentially particulate-free, and can be easily processed further by the conventional purification process including, but not limited to, acid gas removal and sulfur recovery, Meanwhile, the solids mixture exiting the particle filtration unit 110 comprises solidified ash, char, and fluxing agent, and this mixture is combined with the solid product stream 70 exiting initial separating device 50. The combined solids are then recycled back to the first stage of the reactor using a high-pressure gas (that may comprise synthesis gas) as the driving force. The recycled solids may be added to the fired lower section 30 through dispersion devices 60 and/or 60a as feedstock for the first stage reaction. These dispersion devices may optionally mix in an oxygen-containing gas and/or steam to drive the first stage gasification process, thereby producing mixture products including raw synthesis gas and heat required for the second stage process that occurs within the unfired upper section 40 (as described above). Any gas containing at least 20 percent oxygen may be used as the oxygen-containing gas fed to reactor lower section 30. Preferred oxygen-containing gases include oxygen, air, and oxygen-enriched air.

The physical conditions of the reaction in the first stage of the process in the reactor lower section 30 are controlled and maintained to assure rapid gasification of the recycled char at temperatures exceeding the melting point of ash produced by char gasification. By doing so, a molten slag is created from the melted ash that has a viscosity not greater than approximately 250 poises, but more preferably less than 100 poises. The addition of fluxing agent to the lower section 30 of the gasification reactor 10 through the recycling of char to the first stage of the gasification reactor serves to decrease the melting point as well as the slag viscosity when needed, thereby ensuring adequate drainage of slag through the tap-hole at the bottom of the lower section 30.

The use of fluxing agents in gasification processes is common in the art, and minerals most commonly utilized for this purpose include limestone ($CaCO_3$), and quick lime (CaO), MgO, clay, silicates, borates, flyash, slag, and mixtures thereof. Mathematical relationships exist to assist in calculating the proper amount of fluxing agent required, as the optimum quantity and mixture of fluxing agent required changes based upon the composition of the feedstock. A book chapter by Benson and Sondreal discusses this area in detail.

An advantage of indirectly adding fluxing agent to the gasification reactor 10 by combining it with the char that is recycled back to the lower section 30 is that this eliminates the need to pre-mix the fluxing agent into the carbonaceous feedstock prior to addition of the mixture to the first stage 30 of the gasification reactor 10. Thus, the feedstock is not diluted with fluxing agent, and the rate at which feedstock can be fed to the gasification reactor is maximized.

The fuel to be utilized in the current invention can be any reasonably finely-divided carbonaceous material, and any of the known methods of reducing the particle size of particulate solids may be employed, including the use of ball, rod and hammer mills. While particle size is not critical, finely divided carbon particles are preferred. Preferably, the particulate carbonaceous material is coal which includes, but is not limited to, lignite, bituminous coal, sub-bituminous coal, or any combination thereof. Additional carbonaceous materials that may be used are coke from coal, coal char, coal liquefaction residues, particulate carbon, petroleum coke, carbonaceous solids derived from oil shale, tar sands, pitch, biomass, concentrated sewer sludge, bits of garbage, rubber and mixtures thereof. The foregoing exemplified materials can be in the form of comminuted solids, and for best materials handling and reaction characteristics, as pump-able slurries in a liquid carrier.

As used herein, the term "coarse" is defined as being larger than the pore opening of the filter elements in the particulate filtration device, yet small enough to be easily entrained in the gas stream. A coarse particle stream preferably has an average size range of 5-30 microns.

As used herein, the term "conditioning" refers to the deposition of a thin layer of particles either onto, or within the pores of a filtration medium to decrease the subsequent permeability of the filtration media to smaller particles, while maintaining permeability to gas.

As used herein, the term "syngas" is synonymous with the term "synthesis gas" or a gas that is produced in a gasification reactor from a carbonaceous feedstock, comprising $H_2$ and CO as major constituents.

As used herein, the term "char" refers to partially reacted carbonaceous material and ash particles that remain entrained within a raw synthesis gas produced by a gasification system.

As used herein, the term "ash" is synonymous with "fly-ash", and refers to the mineral content of the carbonaceous feedstock that remains following gasification of the carbonaceous material. Above the ash fusion temperature, ash fuses to create molten slag.

The scope of patent protection is not intended to be limited by the description set out above, but is only limited by the following claims, with the intended scope including all equivalents of the subject matter of the claims. Each and every claim is incorporated into the specification as an embodiment of the present invention. Thus the claims are a further description and are an addition to the disclosed embodiments of the present invention.

Hypothetical Example 1

The following example is not intended to limit the scope of the invention, but rather, to illustrate certain features of one embodiment. A mixture of kaolin clay and limestone with an average particle size of 15 microns is injected into the raw synthesis gas stream downstream of the cyclone (initial separating device) and upstream of the particle filtration unit. The average size of the remaining entrained char particulates downstream of the cyclone is typically 1-2 microns. The coarse particle size of the additive prevents the fine submicron char particles from being lodged and embedded in the pore of the filter, thereby causing plugging of the filter. The kaolin and limestone particles simultaneously may also capture and scavenge certain trace contaminants or volatile metals, such as, but not limited to, arsenic and germanium. The char, kaolin, and limestone mixture, after being separated by the filter from the syngas stream, is transported and injected into the slagging gasifier. The char is consumed by the gasification process and converted to useful synthesis gas, while the kaolin and limestone react with the ash components in the carbonaceous feedstock (such as, but not limited to, coal or petroleum coke) to form a free-flowing molten slag mixture that drains from a taphole at the lowest point in the gasifier. In this example, limestone addition lowers the melting point of the slag (thereby reducing the viscosity at gasification temperatures) whereas kaolin provides a glassy silicate matrix to render the slag relatively inert and non-leaching. The amount of kaolin and limestone added is adjusted according to the composition of the ash in the carbonaceous feedstock. The viscosity of the slag is monitored and the addition of fluxing agent upstream from the particle filtration unit is adjusted accordingly. If the molten slag is too viscous, more fluxing agent is added until the viscosity is reduced. Preferably, the final viscosity of the slag after fluxing agent addition is less than 250 poises, but more preferably, less than 100 poises.

REFERENCES

All of the references cited herein are expressly incorporated by reference. Incorporated references are listed again here for convenience:
1. U.S. Pat. No. 4,310,422 (Romey, Pass) Method of Processing and Recirculating Filtration Residues." (1982).
2. U.S. Pat. No. 4,764,355 (Romey, Ahland, Pass, Verfuss) "Process for Removal of Solid and Gaseous Noxious Matter From Hot Gasses." (1988).
3. U.S. Pat. No. 4,973,459 (Lippert, Ciliberti) "Apparatus and Method for Removing Gaseous Contaminants and Particulate Contaminants from a Hot Gas Stream" (1990).
4. U.S. Pat. No. 5,114,581 (Goldsmith, Bishop) "Back-flushable Filtration Device and Method of Forming and Using Same." (1992).
5. U.S. Pat. No. 5,167,676 (Nakaiashi, Holcombe, Micheli) "Apparatus and Method for Removing Particulate Deposits from High Temperature Filters." (1992)
6. U.S. Pat. No. 5,198,002 (Mei, DeVault, Halow) "Gas Stream Clean-Up Filter and Method for Forming Same." (1993).
7. US2002/0146362 A1 (Mcquigg, Scott, Mellot, Stevens) "Method of Filtration and Cleansing of High Temperature Combustible Gases" (2002).
8. US2006/0229212 A1 (Willberg, Dismuke) "Self-Distructing Filter Cake" (2006).
9. (Benson and Sondreal). "Ash-related Issues During Combustion and Gasification" Chap. 1 in *Impact of Mineral Impurities in Solid Fuel Combustion*, Springer US, 1999.

I claim:

1. An improved process for gasification of a carbonaceous material, comprising:
    a. providing a gasification reactor, wherein said reactor converts carbonaceous feedstock to produce a mixture product comprising a first gaseous product stream and char,
        wherein said gaseous product stream comprises $H_2$, and CO,
    b. passing said mixture product through an initial separating device, whereby some of said char is removed from said gaseous product stream,
    c. introducing a coarse particulate fluxing agent into the gaseous product stream downstream from said initial separating device, wherein said coarse particulate fluxing agent has an average size range between 5 microns and 30 microns,
    d. providing a particle filtration unit comprising a plurality of filter elements downstream from the point of introduction of said coarse particulate fluxing agent,
    e. depositing a thin layer of the fluxing agent onto and within the pores of the filter elements to condition the filter elements and decrease the subsequent permeability of the filter elements to entrained char particles, while maximizing permeability of the filter elements to synthesis gas;
    f. periodically removing a mixture comprising filter-cake from the filter elements by back-pulsing, wherein said filter-cake comprises coarse particulate fluxing agent and char,
    g. forming a mixture comprising the removed char of step (b) and the removed filter-cake of step (f), then routing this mixture to the gasification reactor of step (a).

2. The process of claim 1,
    wherein said coarse particulate fluxing agent decreases the melting point and viscosity of molten slag in the gasification reactor, thereby assisting in the removal of the molten slag from the reactor.

3. The process of claim 1,
    wherein the average size of said coarse particulate fluxing agent is from about 5 to 35 microns.

4. The process of claim 1,
    wherein the coarse particulate fluxing agent of step (d) comprises limestone, magnesium oxide, clay, silicates, borates, flyash, slag, and mixtures thereof.

5. The process of claim 1, further comprising a step of passing said mixture product of step (a) into a heat recovery zone prior to step (b),
    wherein said heat recovery zone comprises a heat recovery device selected from a group consisting of radiant heat type boiler, water tube boiler, fire tube boiler and combinations thereof.

6. The process of claim 1 or 5,
    wherein the gasification reactor of step (a) comprises a first and second stage.

7. An improved process for gasification of a carbonaceous material, comprising:
    a. providing a gasification reactor comprising a first stage for partially combusting the carbonaceous material to produce heat and a first mixture product, and an unfired second stage for pyrolyzing the mixture product, wherein said reactor converts carbonaceous feedstock to produce a mixture product comprising a first gaseous product stream and a solid particulate stream, wherein said first gaseous product stream comprises $H_2$ and CO, and wherein said solid particulate stream comprises char;

b. passing said mixture product through an initial separating device, whereby some of said char is removed from said gaseous product stream, c. introducing a coarse particulate fluxing agent into the gaseous product stream downstream from said initial separating device, wherein said coarse particulate fluxing agent has an average size range between 5 microns and 30 microns, d. providing a particle filtration unit comprising a plurality of filter elements downstream from the point of introduction of said coarse particulate fluxing agent, e. depositing a thin layer of the fluxing agent onto and within the pores of the filter elements to condition the filter elements and decrease the subsequent permeability of the filter elements to entrained char particles, while maximizing permeability of the filter elements to synthesis gas;

f. periodically removing a mixture comprising filter-cake from the filter elements by back-pulsing, wherein said filter-cake comprises coarse particulate fluxing agent and char.

g. forming a mixture comprising the removed char of step (b) and the removed filter-cake of step (f), then routing this mixture to the gasification reactor of step (a).

8. The process of claim 7, wherein the coarse particulate fluxing agent decreases the melting point and viscosity of molten slag in the gasification reactor, thereby assisting in the removal of the molten slag from the reactor.

9. The process of claim 7, wherein the coarse particulate fluxing agent comprises limestone, magnesium oxide, clay, silicates, borates, flyash, slag, and mixtures thereof.

10. The process of claim 7, further comprising a step of passing said mixture product of step (a) into a heat recovery zone prior to step (b), wherein said heat recovery zone comprises a heat recovery device selected from a group consisting of radiant heat type boiler, water tube boiler, fire tube boiler and combinations thereof.

* * * * *